United States Patent [19]
Betts

[11] 3,947,634
[45] Mar. 30, 1976

[54] SYSTEM FOR SYNCHRONIZING LOCAL PSEUDO-NOISE SEQUENCE TO A RECEIVED BASEBAND SIGNAL

[75] Inventor: William L. Betts, St. Petersburg, Fla.

[73] Assignee: NCR Corporation, Dayton, Ohio

[22] Filed: Nov. 21, 1974

[21] Appl. No.: 525,910

[52] U.S. Cl............ 178/69.5 DC; 325/321; 331/78
[51] Int. Cl.² .......................................... H04L 7/00
[58] Field of Search ......... 178/67, 69.5 R, 69.5 DC, 178/69.5 G; 325/320, 321; 331/78

[56] References Cited
UNITED STATES PATENTS

| | | | |
|---|---|---|---|
| 3,402,265 | 9/1968 | Couvillon | 325/320 |
| 3,514,702 | 5/1970 | Nahay et al. | 178/67 |
| 3,777,278 | 12/1973 | Majeau | 331/78 |

Primary Examiner—Albert J. Mayer
Attorney, Agent, or Firm—J. T. Cavender; Albert L. Sessler, Jr.; Edward Dugas

[57] ABSTRACT

The present system generates a local PN (Pseudo Noise) sequence demodulation bit stream in synchronism with the modulation sequence of a received baseband signal. The system is comprised of a PN sequence generator for generating a local PN sequence signal in response to the pulse rate of a clock signal. A digital delay line generates early and late phases of the local PN sequence, which phases are correlated with the modulation sequence of the received signal. Early correlation causes pulses to be inserted into the train of clock pulses while late correlation causes pulses to be deleted from the train of clock pulses. A phase error less than a predetermined range (dead band) results in no adjustments to the train of clock pulses.

7 Claims, 5 Drawing Figures

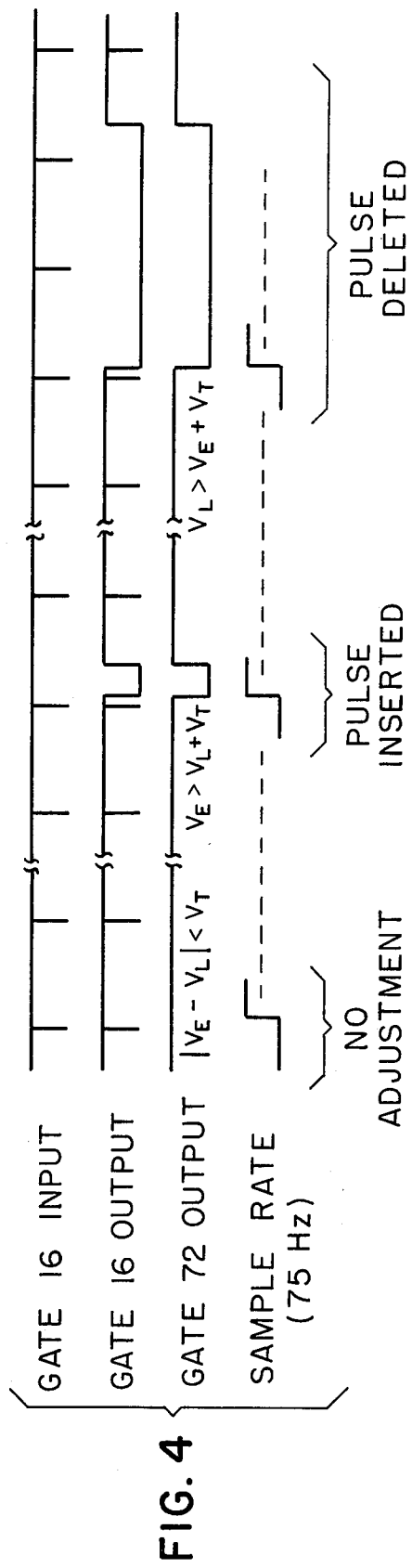

SYSTEM FOR SYNCHRONIZING LOCAL PSEUDO-NOISE SEQUENCE TO A RECEIVED BASEBAND SIGNAL

BACKGROUND OF THE INVENTION

1. Field of Invention

The present invention is directed to a digital modulation phase locked loop and more particularly to a system for synchronizing a local pseudo-random sequence signal generator to a received baseband signal wherein modulation was performed using a pseudo-random sequence signal.

2. Description of the Prior Art

In communication systems phase locked loops have been used to synchronize a variable frequency oscillator in phase or frequency with the carrier portion of a received signal. In digital type communication systems the problem of phase jitter caused by a lack of synchronization between the phase of the local oscillator, usually a train of clock pulses, and the carrier or reference signal of the received signal, causes errors in the detected bit stream.

A prior art system of interest is disclosed in U.S. Pat. No. 3,447,085, entitled "Synchronization of Receiver Time Base in Plural Frequency Differential Phase Shift System" by T. DE HAAS et al. The system disclosed in the prior art patent achieves synchronization of the receiver time base with the time base of the received signals without the use of pilot tones. Locally generated signals are combined with the received signal and correlated to derive output signals which vary in accordance with the phase difference between the locally generated signals and the time base of the received signal. The output signals are fed to decision circuits which produce command signals. The command signals are used to control the frequency of the receiver time base by adding or deleting pulses from a pulse train, to thereby produce a receiver time base signal whose phase corresponds to the phase of the time base of the received signals.

Another prior art circuit of interest is disclosed in U.S. Pat. No. 3,745,248, entitled "Course Initial Timing Recovery Circuit", by EARL D. GIBSON. The circuit of the prior art patent achieves synchronization of a locally generated timing signal with the baud rate of a received signal without the use of pilot tones. A pair of comparators are used to provide output signals each time the received signal crosses through one of several preselected thresholds. An EARLY/LATE detector compares the locally generated timing signal against the output signals from the comparators and provides a first signal when the comparison is late and a second signal when the comparison is early. A pulse train generator generates the local timing signal which signal is modified by the first or second detection provided signals by adding or deleting pulses into the local timing signal to synchronize the local timing signal to the baud rate of the received signal.

SUMMARY OF THE INVENTION

The present invention is a digital modulation phase locked loop wherein the phase of a pseudo-noise sequence reference signal is synchronized in phase with the pseudo-noise modulation sequence of a received baseband signal by the insertion or the deletion of pulses into the pulse train which is used to drive the pseudo-noise sequence signal generator. Two correlators are used to compare the correlation of the received baseband signal with an early phase and a late phase of the pseudo-noise (PN) sequence signal. A comparing means compares the correlation signals against fixed reference signals to provide signals indicative of the deviation of the correlation signals from the fixed reference signals. A comparison which falls outside of a fixed range activates the circuitry for adding or deleting pulses to the pulse train.

From the foregoing it can be seen that a primary object of the present invention is to provide an improved digital modulation locked loop.

It is another object of the present invention to provide a digital modulation locked loop wherein no correction is applied when the loop is within a predetermined locking range.

It is a further object of the present invention to provide a novel digital modulation locked loop wherein the phase of a pseudo-noise sequence reference signal is synchronized with the pseudo-noise modulation sequence of a received baseband signal.

These and other objects of the present invention will become more apparent and better understood when taken in conjunction with the following description and drawings, wherein like characters indicate like parts and which drawings form a part of the present application.

BRIEF DESCRIPTION OF THE DRAWINGS

FIG. 4 illustrates waveforms waveform taken at designated locations in the embodiment of FIG. 1.

DESCRIPTION OF THE PREFERRED EMBODIMENT

Figure 1A:
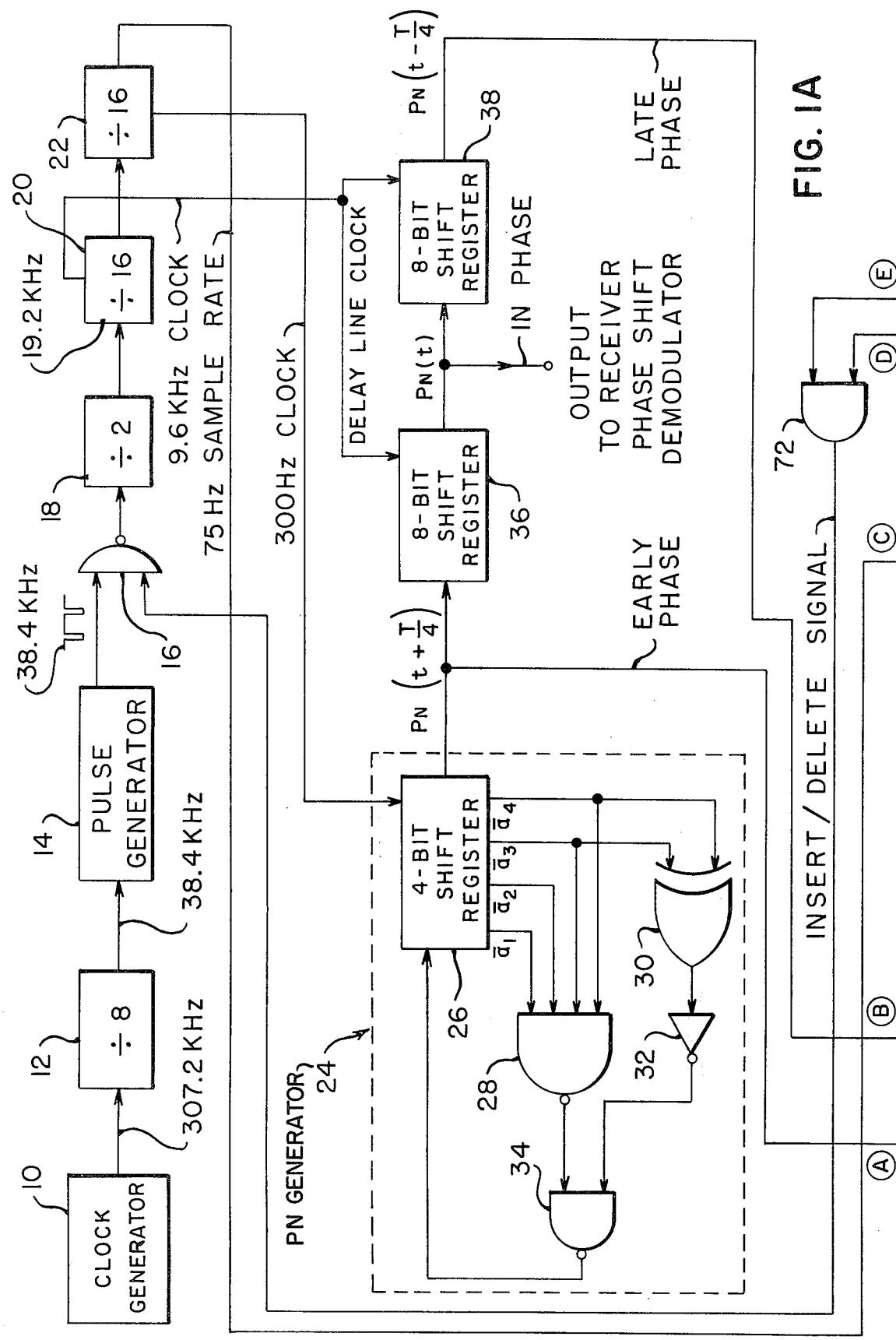
FIGS. 1A and 1B illustrate in schematic block diagram form the preferred embodiment of the invention.
Figure 1B:
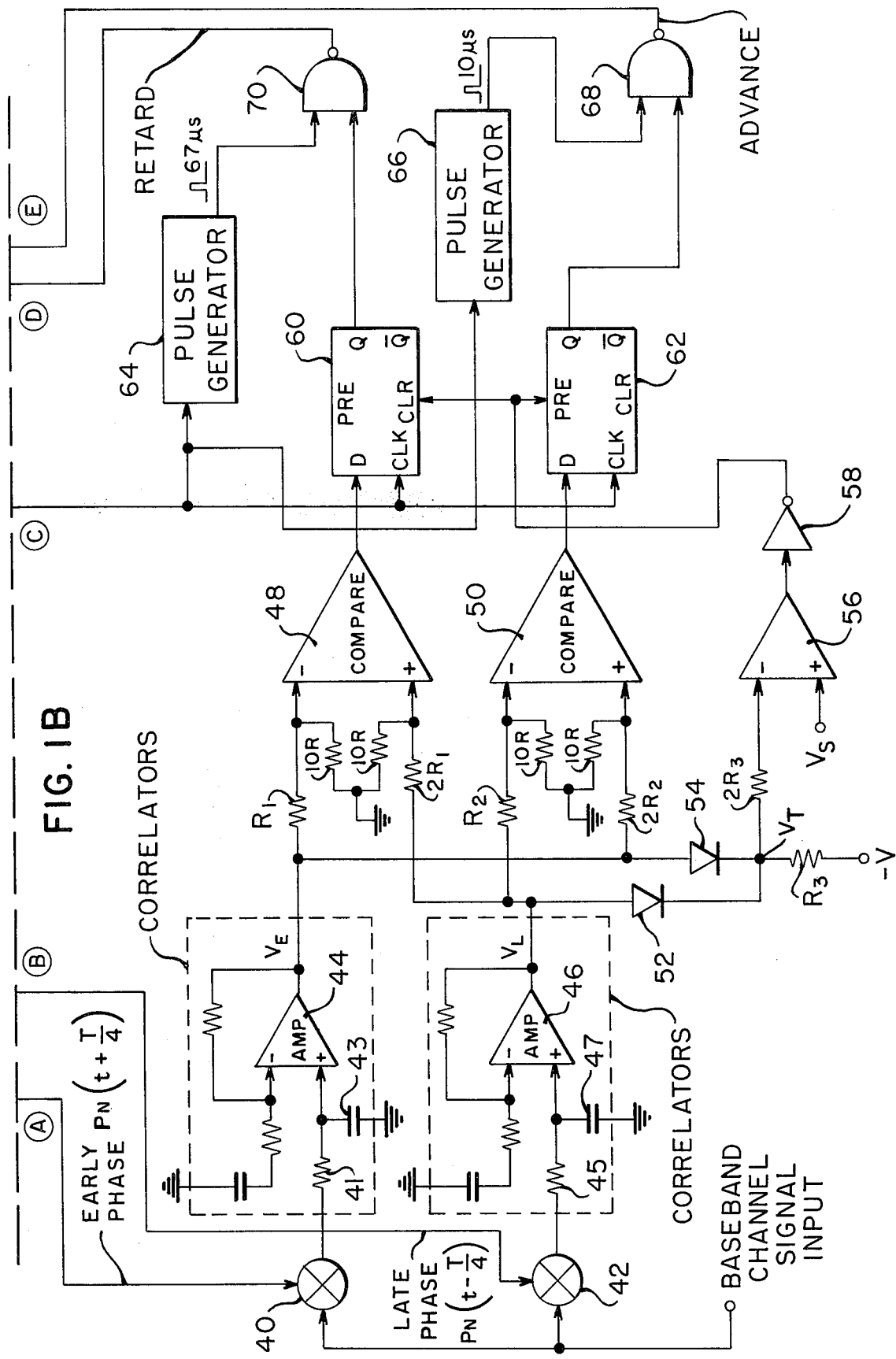

Referring to FIGS. 1A and 1B, the clock generator 10, which may be a crystal controlled oscillator, provides a signal, which is stable in frequency, to the divider 12. The divider 12 divides the stable frequency signal by eight and directs the divided signal to a pulse generator 14. The pulse generator 14 converts the stable frequency signal into a train of pulses which are fed to an input of a NAND gate 16. In the preferred embodiment the stable frequency signal is 307.2 KHz. The pulses generated by the pulse generator 14 has a period equal to ⅛ of the stable frequency signal and a pulse width equal to 0.3 $\mu$s. The NAND gate 16 receives as its other input an INSERT or DELETE signal from AND gate 72. In response to the INSERT or DELETE signal a pulse is either added to, or deleted from, the pulse train generated by pulse generator 14. The resultant pulse train from the NAND gate 16 is further divided by dividers 18, 20, and 22. The first divide by two stage (not shown) of divider 20 is tapped to provide a delay line clock signal having a centered pulse repetition rate of 9.6 KHz, which signal is used to clock shift delay line registers 36 and 38. The second divide by two stage (not shown) of divider 22 is tapped to provide a local reference signal having a centered pulse repetition rate of 300 Hz. The 300 Hz signal from divider 22 is used to drive the pseudo-noise (PN) sequence signal generator 24. The remaining output signal from divider 22 is the sample rate signal, having a centered pulse repetition rate of 75 Hz, which signal is used to clock flip-flops 60 and 62 and to drive pulse generators 64 and 66. Pulse generator 64 generates a pulse having a width of 67 μs upon receipt of a pulse from the sample rate signal. The width of the pulse from pulse generator 64 is sufficient to insure that at least one pulse will be deleted from the pulse train from pulse generator 14, when the pulses are logically combined in NAND gate 16. Pulse generator 66 generates a pulse having a width of 10 μs upon receipt of a pulse from the sample rate signal. The width of the pulse from pulse generator 66 is sufficient to insure that at least one pulse will be added to the pulse train from pulse generator 14 when the pulses are logically combined in NAND gate 16. In partial summary, elements 10, 12, 14, 16, 18, 20, and 22 form a digital frequency divider chain for providing signals for driving the PN sequence signal generator, for sampling received signals, and for clocking early and late phases of the PN sequence thru the delay line registers 36 and 38.

The PN sequence signal generator 24 is comprised of a 4-bit shift register 26, and feedback logic, which logic is designed to generate a 15-bit PN (pseudo-noise) sequence which sequence corresponds to the sequence used to modulate the received baseband signal. With the logic shown the invalid "all zero's" state of the shift register is inhibited. The shift register bit outputs $\bar{a}_1, \bar{a}_2, \bar{a}_3$ and $\bar{a}_4$ are fed to the inputs of the NAND gate 28. The bit outputs $\bar{a}_3$ and $\bar{a}_4$ are also fed to the inputs of an EXCLUSIVE-OR gate 30. The output signal from gate 30 is inverted by inverter 32 and NAND'ed with the output signal from gate 28 by NAND gate 34. The output signal from gate 34 is fed back as an input to the shift register 26. The 300 Hz clocking signal from divider 22 provides the basic clocking signal for the shift register. The clocking signal steps the signal from gate 34 thru the stages of the shift register. The output signal PN ($t+T/4$) from the shift register 26 is early in phase by 8 bits. The quantity T in the output signal function is equal to one PN sequence bit time. The shift register output signal is fed to an 8-bit shift register 36 which shift register is clocked by the 9.6 KHz signal from divider 20. The signal PN($t$) from the output of the shift register 36 is the in-phase PN sequence signal which is maintained in phase with the PN sequence of the received baseband signal within a known dead band (tolerance range). The PN($t$) signal is fed to a second 8-bit shift register 38, which shift register delays the PN($t$) signal for 8 bits to provide a late phase signal PN ($t-T/4$). The shift register 38 is clocked by the 9.6 KHz signal from divider 20.

The received baseband signal is fed to inputs of multipliers 40 and 42. The early phase signal PN ($t+T/4$) is multiplied by the baseband signal in the multiplier 40 and the product signal is fed to an input of a differential amplifier 44 via a low pass filter network comprised of a resister 41 and a capacitor 43. The low pass filter network removes undesired high frequency signal components from the product signal. The late phase signal PN ($t-T/4$) is multiplied by the baseband signal in the multiplier 42 and the product signal is fed to an input of a differential amplifier 46 via a low pass filter network comprised of a resistor 45 and a capacitor 47.

Amplifiers 44 and 46 convert the product signals at their inputs into corresponding average D.C. voltage output signals, labelled $V_E$ and $V_L$ respectively. The signal $V_E$ is fed to an input of a compare amplifier 48, via a resistor $R_1$, and to an input of a compare amplifier 50, via a resistor $2R_2$.

The signal $V_L$ is fed to an input of a compare amplifier 50, via a resistor $R_2$ and to an input of a compare amplifier 48, via a resistor $2R_1$. Each input, of amplifiers 48 and 50, is connected to ground through a signal developing resistor 10R.

Diodes 52 and 54 connect the outputs of amplifiers 46 and 44 respectively to a summing point. The summing point is connected to a negative bias voltage, $-V$, through resistor $R_3$ and to compare amplifier 56 through resistor $2R_3$. The other input of compare amplifier 56 is connected to a D.C. sweep threshold voltage source $V_S$.

The output signal from compare amplifier 56 is inverted by an inverting amplifier 58. A D-type flip-flop 60 receives the output signal from the compare amplifier 48 on its D input. A D-type flip-flop 62 receives the output from the compare amplifier 50 on its D input. The D-type flip-flop provides an output signal which is equal to the input signal that occurred one bit time earlier on its input.

The 75Hz sample rate signal from divider 22 is fed to the clocking inputs of flip-flops 60 and 62. The output signal from inverting amplifier 58 is fed to the clear and the preset inputs of flip-flops 60 and 62, respectively. The Q-output signals from flip-flops 60 and 62 are fed to an input of NAND gates 70 and 68, respectively.

When the input signal, at the negative input of amplifier 56, falls below the level of the signal $V_S$ on the positive input of amplifier 56, a signal is sent to the clear and reset terminals of flip-flops 60 and 62, respectively. Flip-flop 62 then causes pulses to be inserted into the 300 Hz clock to force a phase sweep of the PN sequence signal. Flip-flop 60 is maintained in the cleared state until the phase of the generated PN sequence signal is within synchronizing range with the baseband signal.

The output signal from NAND gate 70 is a retard signal which is fed to an input of AND gate 72. The output signal from NAND gate 68 is an advance signal which is fed to an input of AND gate 72. The retard or advance signal from AND gate 72 is fed to an input of NAND gate 16, so as to either delete or to insert pulses in the pulse train from pulse generator 14.

Compare amplifiers 48 and 50 compare the amplitudes of the signals $V_E$ and $V_L$ to each other relative to the fixed threshold signal, $V_T$, and to the sweep threshold signal, $V_S$, established by voltage divider resistors $R_1$, $2R_1$, and 10R. The resultant control actions are as follows:

| | |
|---|---|
| $V_E < V_S$ and $V_L < V_S$ | → No correlation; pulses are inserted to force a sweep of the local PN sequence. |
| $\|V_E - V_L\| < V_T$ | → Satisfactory correlation; no control action is taken. |
| $V_E > V_L + V_T$ | → Early correlation; pulses are inserted to advance the phase of the local PN sequence. |
| $V_L > V_E + V_T$ | → Late correlation; pulses are deleted to retard the phase of the local PN sequence. |

Figure 2:
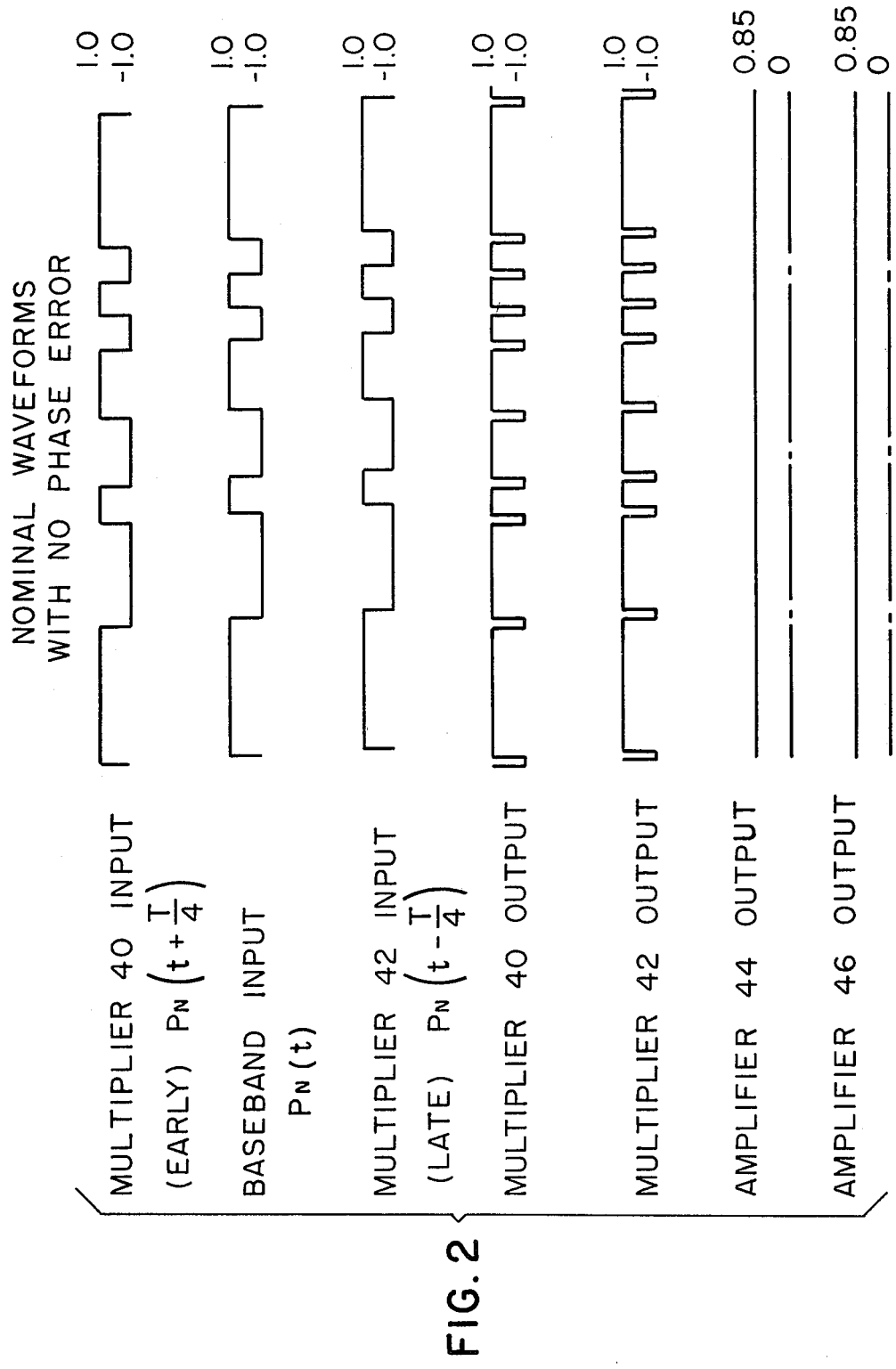
FIG. 2 illustrates waveforms taken at designated locations in the embodiment of FIG. 1.

Referring now to the waveforms of FIG. 2 which illustrate the no phase error condition; the baseband input signal is shown varying in amplitude between nominal values of +1 and −1, with the +1 value generally denoting a binary "one" and the −1 value generally denoting a binary "zero".

The multipliers 40 and 42 aside from receiving the baseband signal also receive the early and the late phase shifted PN sequence signals respectively. The phases of the early and the late phase shifted PN sequence signals are shifted by +T/4 and −T/4, respectively.

The output signals from multipliers 40 and 42 are similar in amplitude and pulse width, but are shown shifted in phase with respect to each other.

The D.C. average output signals $V_E$ and $V_L$ from amplifier 44 and 46, respectively, are therefore equal in amplitude level.

Figure 3:
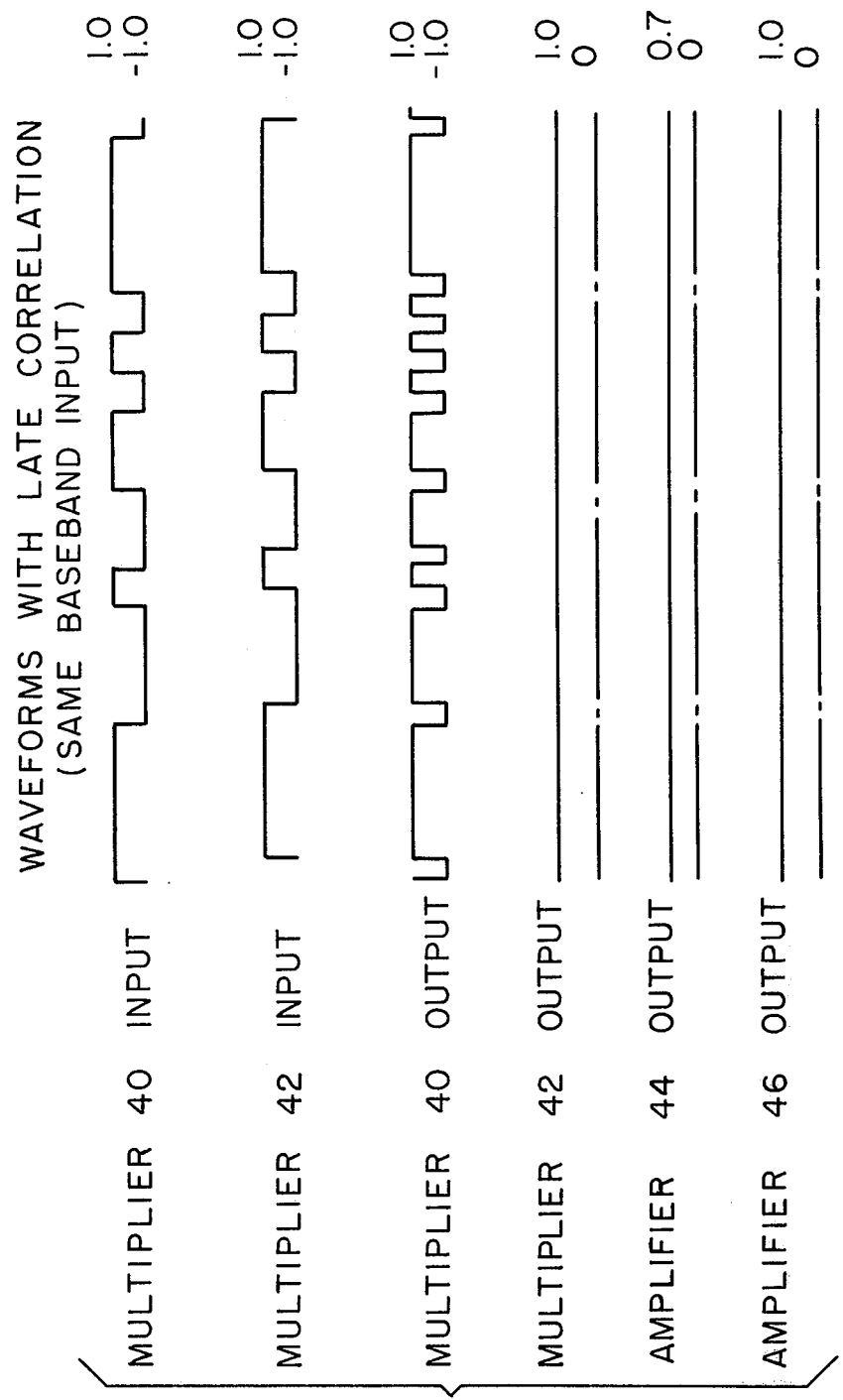
FIG. 3 illustrates waveforms of the type shown in FIG. 2 corresponding to late correlation.

Referring to the waveforms of FIG. 3 which illustrate the condition of late correlation occurring with the same received baseband input signal; the early and the late phase shifted PN sequence signals received by multipliers 40 and 42, have shifted to the left by an amount corresponding to the degree of lateness in the correlation, that is by an amount equal to T/4. The output signal from multiplier 40 therefore increases in pulse width. The degree of lateness in the late phase shifted PN sequence signal brings this signal in phase with the received baseband signal. The output signal from multiplier 42 is, therefore, a D.C. signal having a nominal amplitude level of +1.

The D.C. amplitude signals from amplifiers 44 and 46 will therefore have nominal amplitude of +0.7 and +1.0, respectively.

Referring to the waveforms of FIG. 4, the input clock pulse train signal to gate 16 is shown as a steady stream of pulses having a repetition rate of 38.4 KHz. The other input signal to gate 16 is provided by the output signal from gate 72 which output signal is the Insert-/Delete signal. The gate 72 output signal is shown in its three possible states, no adjustment, pulse inserted, and pulses deleted, respectively. The resultant output signal from gate 16 is also shown in its three possible states. The sample rate signal (75 Hz) is shown with its positive going transitions only as the flip-flops 60 and 62 only respond to the positive going transition of a signal.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A digital modulation locked loop for generating and for synchronizing a generated demodulation sequence signal with a corresponding modulation sequence in a received baseband signal, comprising in combination:

means for generating an early phase pseudo-noise demodulation sequence signal the phase of which is controlled by the pulse rate of a train of modified clock pulses, which means when in a phase locked condition maintains the phase of said pseudo-noise demodulation sequence signal advanced in phase with respect to the phase of the pseudo-noise modulation sequence of the received baseband signal;

delay means for delaying said generated early phase pseudo-noise demodulation sequence signal by fixed amounts to provide a delayed in-phase pseudo-noise demodulation sequence signal and an in-phase demodulation sequence signal;

means for correlating said early phase pseudo-noise demodulation sequence signal and the delayed in-phase pseudo-noise demodulation sequence signal with the modulation sequence signals of the received baseband signal to provide correlation signals the levels of which are indicative of the degree of correlation;

means for establishing fixed reference signals about levels encompassing the levels corresponding to desired degrees of correlation;

comparing means for comparing the levels of said correlation signals against said fixed reference signals to provide comparing signals indicative of the deviation of said correlation signals from the levels encompassed by said fixed reference signals;

clock means for providing a train of clock pulses to said means for generating an early phase pseudo-noise demodulation sequence signal; and means for inserting or deleting pulses into said provided train of clock pulses as a function of the deviation indicated by said comparing signals so as to provide a train of modified clock pulses for increasing the correlation of said early phase pseudo-noise demodulation sequence signal and said delayed in-phase pseudo-noise demodulation sequence signal with said modulation sequence in said baseband signal to maintain synchronization between said in-phase modulation sequence signal and the corresponding modulation sequence in said received baseband signal.

2. The digital modulation locked loop according to claim 1, wherein said means for generating an early phase pseudo-noise demodulation sequence signal is comprised of:

a shift register having a plurality of stages, and having at least two inputs and an output, one of said inputs connected to receive said train of modified clock pulses, with said output connected to said delay means;

logic means connected between selected stages of said shift register and another input to said shift register for feeding back logically combined signals from said selected stages to said another input of said shift register so as to generate said early phase pseudo-noise demodulation sequence signal the phase of which is dependent on the rate of the pulses in the received train of modified clock pulses.

3. The digital modulation locked loop according to claim 1, wherein said means for correlating is comprised of:

first and second signal multipliers for multiplying said early phase pseudo-noise demodulation sequence signal and said delayed in-phase pseudo-noise demodulation sequence signal against said baseband signal, respectively;

first and second amplifier means for amplifying the product signals the levels of which are from said first and said second signal multipliers, respectively, and for providing signals indicative of the degree of correlation of the multiplied signals.

4. The digital modulation locked loop according to claim 1 and further comprising:

sampling means for sampling the deviation signals of said comparators at a preselected rate and for providing said sampled signals as inputs to said means for inserting or deleting pulses into said provided train of clock pulses.

5. A digital modulation locked loop for use with a receiver of the type that receives a baseband signal that has been phase modulated by a pseudo-noise sequence, for generating a local reference signal which reference signal is maintained substantially in-phase with the pseudo-noise modulated sequence of the received baseband signal;

clock means for providing a train of clock pulses;

gating means responsive to provided insert, or provided delete signals for inserting or deleting pulses, respectively, from said train of clock pulses to provide a train of modified clock pulses;

a pseudo-noise sequence generator responsive to the phase of said modified clock pulses for generating an early phase local pseudo-noise sequence reference signal;

a first delay means for receiving the generated signal from said pseudo-noise signal generator and for delaying said generated signal for a fixed time period so as to provide to the receiver a local pseudo-noise sequence reference signal which signal is substantially in-phase with the pseudo-noise sequence signal used to phase modulate the baseband signal received by the receiver;

second delay means for delaying the substantially in-phase local pseudo-noise sequence reference signal for a fixed time period to provide a late phase local pseudo-noise sequence reference signal;

means for correlating said early and said late phase reference signals against said received baseband signal and for providing correlation signals the levels of which are indicative of the degree of correlation;

means for establishing fixed reference signals about levels encompassing the levels corresponding to desired degrees of correlation;

comparator means for comparing the levels of said correlation signals against said fixed reference signals to provide signals indicative of the deviation of said correlation signals from the levels encompassed by said fixed reference signals; and means for providing an insert or a delete signal to said gating means in response to the signals from said comparator means.

6. The digital modulation locked loop according to claim 5, wherein said pseudo-noise sequence generator is comprised of:

a shift register having a plurality of stages, at least two inputs and an output, one of said inputs connected to receive said provided train of modified clock pulses, and said output providing said early phase local pseudo-noise sequence reference signal;

logic means connected between selected stages of said shift register and the other input to said shift register for feeding back logically combined signals from said selected stages to said other input, so as to generate said early phase local pseudo-noise sequence reference signal at said output.

7. The digital modulation locked loop according to claim 5 wherein said means for correlating is comprised of:

first and second signal multipliers for multiplying said early and said late phase local pseudo-noise sequence reference signals respectively, against the pseudo-noise modulation sequence in said received signal; and first and second amplifier means for amplifying the product signals from said first and said second signal multipliers, respectively, and for providing signals the levels of which are indicative of the degree of correlation of the multiplied signals.

* * * * *